Patented Feb. 20, 1951

2,542,481

UNITED STATES PATENT OFFICE 2,542,481

STABILIZED SODIUM DEHYDROCHOLATE SOLUTION

Lathan A. Crandall, Jr., Elkhart, and Otto F. Ungnade, Fort Wayne, Ind., assignors to Miles Laboratories, Inc., Elkhart, Ind., a corporation of Indiana No Drawing. Application November 6, 1948, Serial No. 58,793

3 Claims. (Cl. 167—65)

The present invention relates to aqueous solutions of alkali metal dehydrocholates which are stabilized against the formation of sediment or precipitate therein after being heat-sterilized in ampoules, by the presence of small amounts of an alkali metal citrate.

Sodium dehydrocholate is useful therapeutically for producing bile flow. It is available for use by the medical profession in the form of an aqueous solution put up in glass ampoules and usually heat-sterilized in an autoclave.

In general, it has been found that most ampoule solutions of sodium dehydrocholate now available contain at least traces of sediment accumulated therein. Such sedimentation makes the ampoules unfit for the intended therapeutic use.

The object of the present invention is to provide aqueous solutions of sodium dehydrocholate which are so stabilized by the presence of a small amount of potassium or sodium citrate as to permit these solutions to be ampouled and heat-sterilized without the formation of precipitates or sediments for at least a substantially long period of time.

In the following example there is set forth a preferred embodiment of the invention:

Example

An aqueous solution is prepared by dissolving in distilled or deionized water sufficient sodium dehydrocholate to give a concentration of 20% by weight, which solution will have a pH value of approximately 9.0. There is also dissolved in the aqueous solution 0.5% by weight of sodium citrate. This solution may be sealed in glass ampoules in accordance with known methods and equipment and the ampoules may then be heat-sterilized in an autoclave.

No visible sedimentation or precipitation occurs in such ampoules for extended periods of time and the pH value of the solutions does not change materially.

It will be understood that certain other formulations may be made in accordance with the invention. The concentration of the sodium dehydrocholate may range from 5 to 23 per cent by weight, and the sodium dehydrocholate may be replaced in whole or in part by an equivalent amount by weight of the potassium dehydrocholate.

The concentration of the sodium citrate may range from 0.3 to 1.5% by weight and this also may be replaced in whole or in part by an equivalent weight of the potassium citrate.

Having fully described our invention, what is claimed as new is:

1. An aqueous solution containing from about 5 to 23% by weight of a member of the group consisting of sodium dehydrocholate and potassium dehydrocholate containing from about 0.3 to 1.5% by weight of at least one alkali metal citrate selected from the group consisting of sodium citrate and potassium citrate and having a pH of approximately 9, said alkali metal citrate stabilizing said aqueous solution against precipitation when said solution is heat sterilized in ampoules.

2. An aqueous solution containing from about 5 to 23% by weight of sodium dehydrocholate, from about 0.3 to 1.5% by weight of at least one alkali metal citrate selected from the group consisting of sodium citrate and potassium citrate and having a pH of approximately 9, said alkali metal citrate stabilizing said aqueous solution against precipitation when said solution is heat sterilized in ampoules.

3. An aqueous solution containing approximately 20% by weight of sodium dehydrocholate and approximately 0.5% by weight of sodium citrate and having a pH of approximately 9, said sodium citrate stabilizing said aqueous solution against precipitation when said solution is heat sterilized in ampoules.

LATHAN A. CRANDALL, JR.
OTTO F. UNGNADE.

REFERENCES CITED

The following references are of record in the file of this patent:

UNITED STATES PATENTS

| Number | Name | Date |
|---|---|---|
| 2,250,474 | Eisenbrand | July 29, 1941 |
| 2,251,042 | Eisenbrand | July 29, 1941 |

FOREIGN PATENTS

| Number | Country | Date |
|---|---|---|
| 526,513 | Great Britain | Sept. 14, 1940 |
| 491,251 | Great Britain | Aug. 30, 1938 |

OTHER REFERENCES

Brecht, The Merck Report, Oct. 1945, pages 27–30.

Wyss, Ibid., April 1945, pages 16–18.

Osol Dispensatory of U. S., J. P. Lippincott, Phila., 1947, 24th ed. pages 805–808.